United States Patent [19]

Williamson

[11] 4,203,702
[45] May 20, 1980

[54] WATER DRIVEN ENGINE

[76] Inventor: Glen A. Williamson, Wagner, Mont. 59543

[21] Appl. No.: 920,815

[22] Filed: Jun. 30, 1978

Related U.S. Application Data

[63] Continuation-in-part of Ser. No. 798,294, May 19, 1977.

[51] Int. Cl.² .............................................. F01D 1/28
[52] U.S. Cl. .......................................... 415/60; 415/2; 416/122
[58] Field of Search .............. 416/121 A, 122 A, 120, 416/129; 415/60, 65, 2–4; 74/665 B, 665 GB, 665 GC, 665 GE

[56] References Cited

U.S. PATENT DOCUMENTS

| 419,345 | 1/1890 | Otto | 415/2 R |
|---|---|---|---|
| 518,300 | 4/1894 | Winegarden | 416/121 A |
| 715,985 | 12/1902 | Cochran | 416/120 |
| 756,616 | 4/1904 | Fornander | 416/121 A X |
| 2,335,817 | 11/1943 | Topalov | 415/2 |
| 2,379,324 | 6/1945 | Topalov | 415/2 |

FOREIGN PATENT DOCUMENTS

| 384349 | 11/1923 | Fed. Rep. of Germany | 416/122 A |
|---|---|---|---|
| 453231 | 12/1927 | Fed. Rep. of Germany | 416/122 A |
| 878481 | 1/1943 | France | 416/121 A |
| 1074780 | 10/1954 | France | 416/DIG. 6 |

Primary Examiner—Everette A. Powell, Jr.
Attorney, Agent, or Firm—Paul J. Van Tricht

[57] ABSTRACT

A water driven engine comprising a frame and two vertical rotors which are rotatably mounted in the frame. The water drive engine is mounted in a stream of water. If desired the engine may be mounted in a low dam. The blades of the vertical rotors overlap. A water diverter is centrally mounted in front of the rotors so as to divide the stream of water and divert the water onto the outer blades of the rotors. The water diversion produced contradirectional rotation of the rotors, i.e., one rotor rotates clockwise and the remaining rotor rotates counterclockwise. The contradirectional rotating rotors are mechanically joined to an energy system and to each other so as to be substantially self-timing and torque-free.

3 Claims, 4 Drawing Figures

WATER DRIVEN ENGINE

This application is a continuation-in-part of application Ser. No. 798,294 filed May 19, 1977.

BACKGROUND OF THE INVENTION

1. Field of the Invention

This invention relates to water driven engines and water turbine systems. More specifically, this invention relates to water driven engines with two vertical, overlapping, contradirectionally rotating rotors which are mounted in a frame and which are mechanically joined to each other and to an energy system so as to be substantially self-timing and torque-free.

2. Description of the Prior Art

Interest is currently being shown in "low technology" energy producing devices like the present invention. Examples of the prior art are found in the following publications: Skurka, N. and Naar, J., *Design for a Limited Planet*, New York, Ballantine Books, 1976; *Handbook of Homemade Power*, New York, Bantam, 1974; and Lindsley, E. F., "Water Power for Your Home," Popular Science, Vol. 210, No. 5, p.87–93 May, 1977.

SUMMARY OF THE INVENTION

The present invention is a water driven engine which is comprised of a frame and two vertical rotors which are rotatably mounted in the frame. The frame is placed in a stream of water. A V- or wedge-shaped water diverter is centrally mounted in front of the two rotors. The diverter divides the water into two separate streams. The water streams strike the blades of the rotors which are adjacent to the sides of the frame and produce contradirectional rotation of the rotors, i.e., one rotor rotates clockwise and the remaining rotor rotates counterclockwise. The contradirectionally rotating rotors are mechanically joined to each other and to an energy system so as to be substantially self-timing and torque-free. The system which joins the two rotors comprises a first shaft rotatably mounted on the frame and a second hollow shaft rotatably mounted on the first shaft. One end of the hollow shaft is attached to a gear means and the remaining end is mechanically joined to the shaft of one of the vertical rotors. The end of the first shaft which extends through the hollow shaft and extends through the hollow shaft's gear means is itself attached to a gear means. The remaining end of the first shaft is mechanically joined to the remaining vertical rotor's shaft. The gears means attached to the end of the hollow shaft and the end of the first shaft are mechanically joined together and to an energy system.

DESCRIPTION OF THE PREFERRED EMBODIMENT

Figure 1:
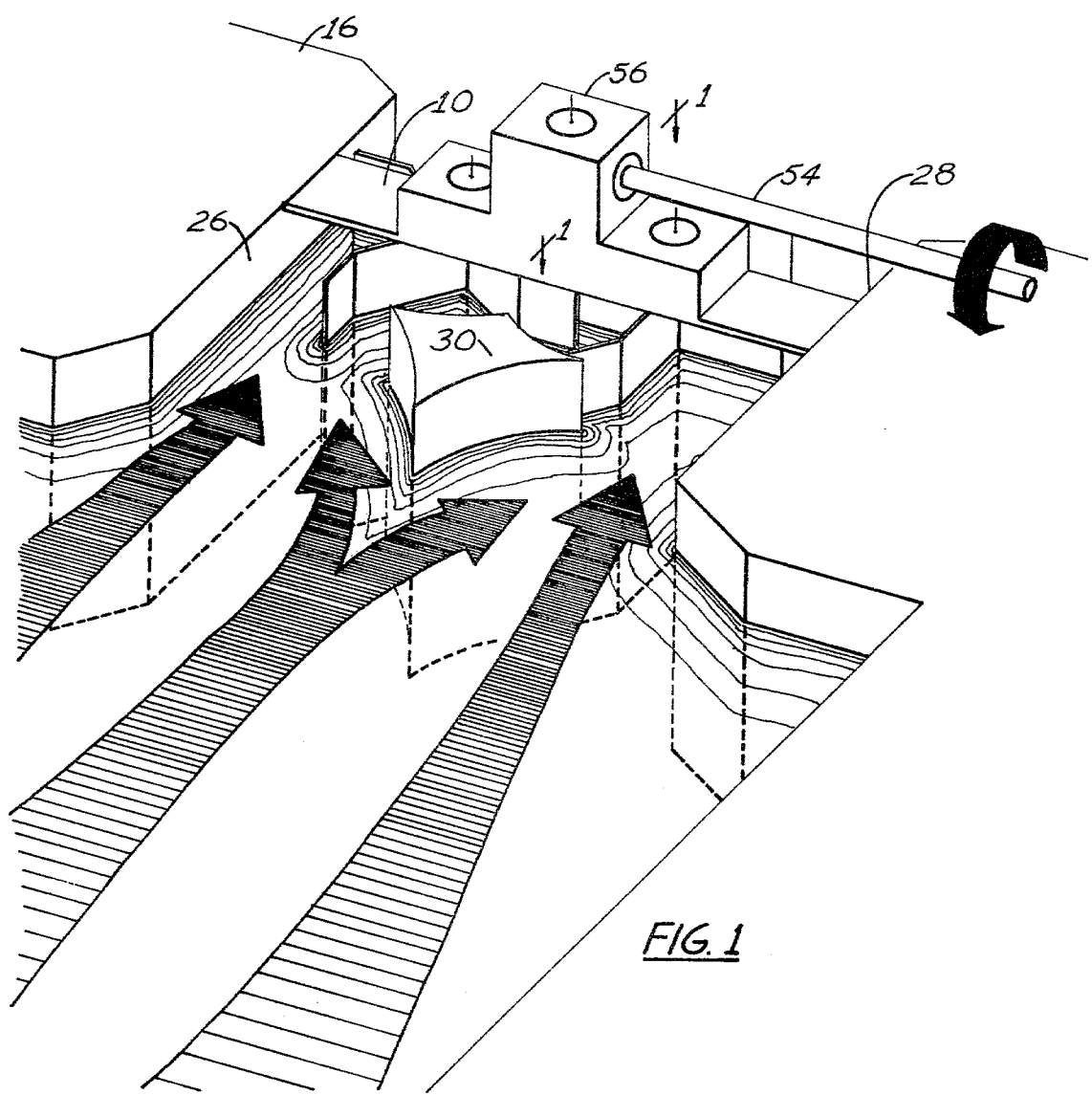
FIG. 1 is a perspective view of a water driven engine of the present invention mounted in a low dam.
Figure 2:
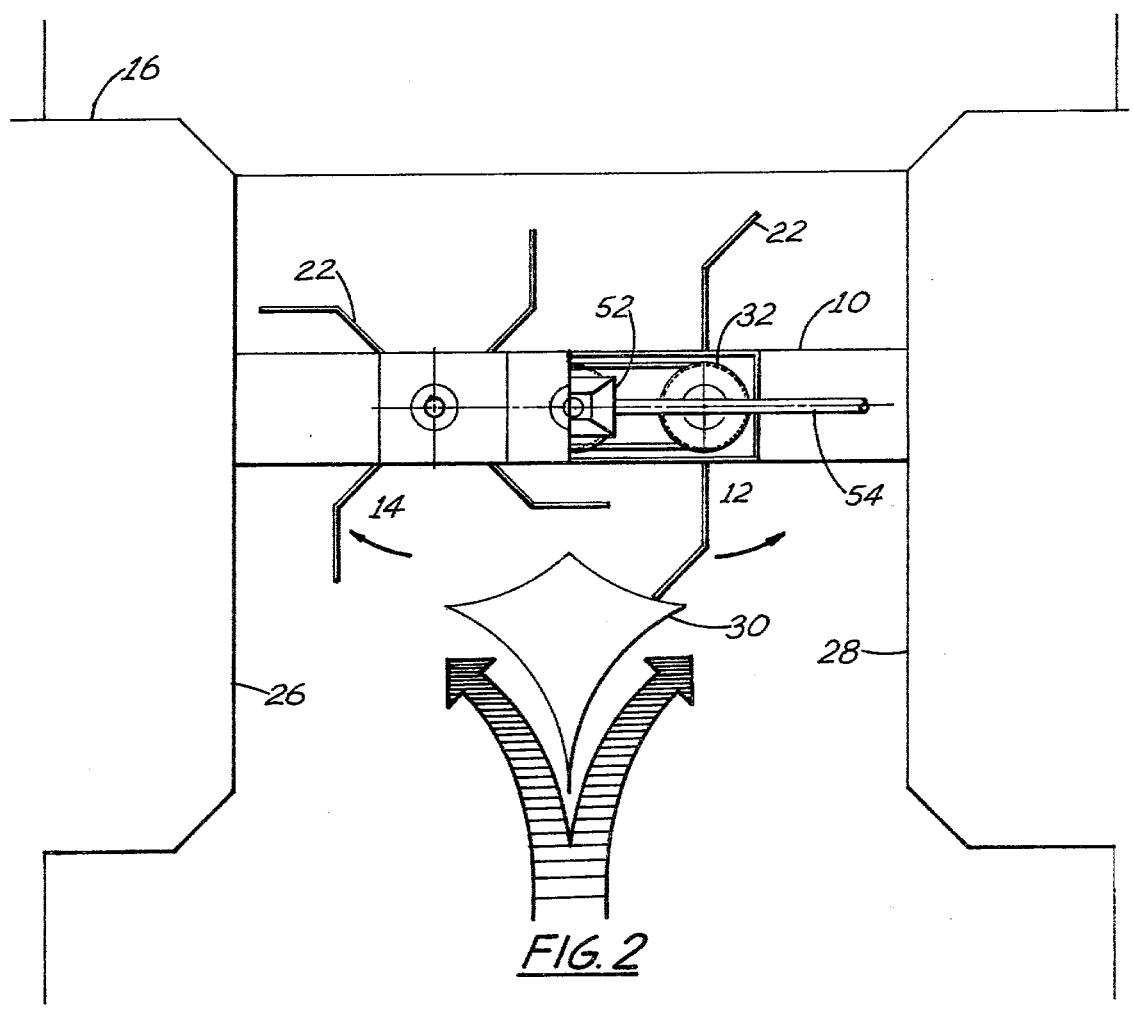
FIG. 2 is a top planar view of a water driven engine of the present invention, partially in section taken on the line 1—1 of FIG. 1.

Referring now to FIGS. 1 and 2, the water driven engine of the present invention comprises a frame 10 and two vertical rotors 12 and 14 which are rotatably mounted in the frame 10. The water driven engine may be free standing in a stream of water or it may be mounted in a low dam 16. The frame 10 is a rigid steel, wooden, plastic or concrete structure which rests on the bottom of the stream or in a low dam 16. The frame 10 is capable of supporting the rotors 12 and 14 in a vertical position while the rotors 12 and 14 are rotated by the flowing water. If the water driven engine is free standing in a stream of water the frame contains sufficient ballast to anchor the water driven engine in the stream of water.

Figure 4:
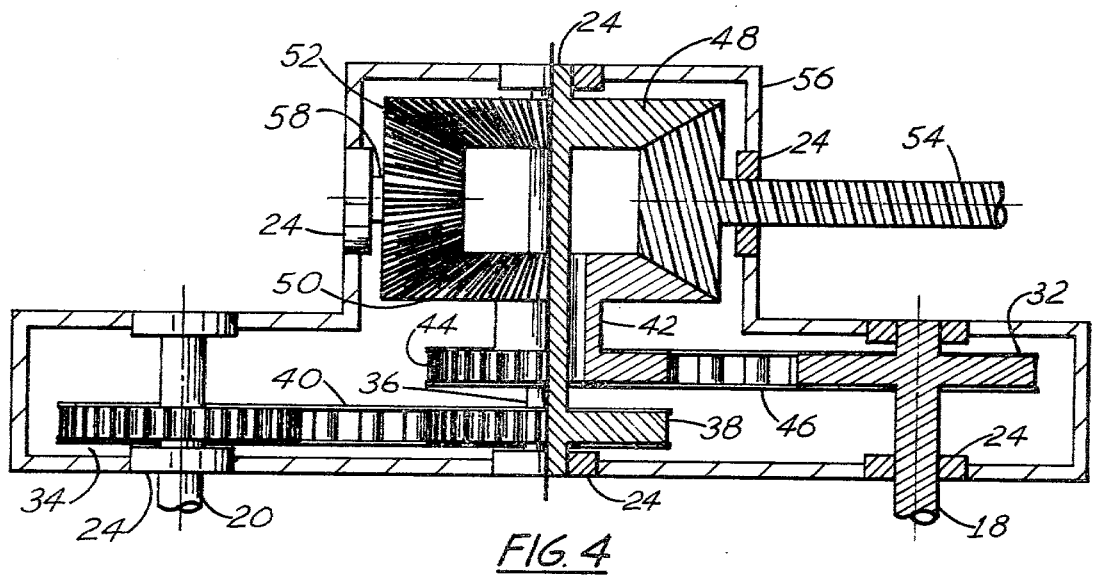
FIG. 4 is a sectional side view of the mechanism which joins the two rotors of the present invention.
Figure 3:
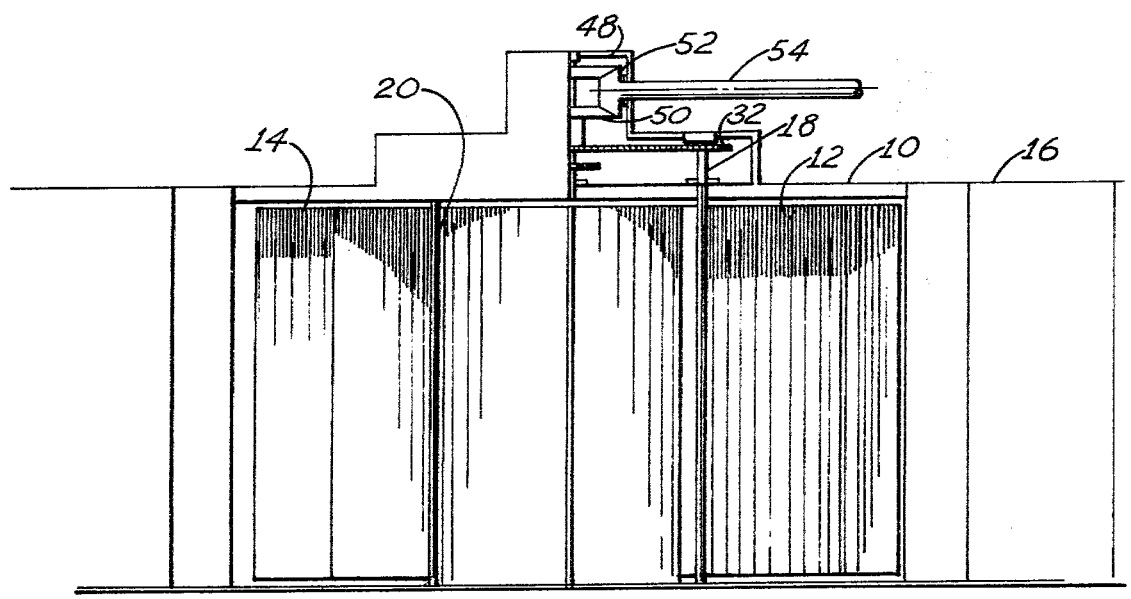
FIG. 3 is a front view, partially in section, of the rotors and rotor drive mechanism of the present invention.

Referring now to FIGS. 3 and 4 the rotors 12 and 14 are comprised of shafts 18 and 20, respectively, on which are mounted a plurality of blades 22. The blades 22 of the rotors 12 and 14 mutually overlap. By overlapping the blades 22 of the rotors 12 and 14 it is possible to increase diameter of the individual rotors 12 and 14 and, thereby, increase the power and efficiency of the water driven engine. The rotor shafts 18 and 20 are mounted on and extend through the frame 10 by means of ball or roller bearings 24 and the like. The two rotors 12 and 14 are enclosed by the sides of the frame 10 or the sides 26 and 28 of the dam 16.

A water diverter 30 is approximately centrally mounted in the water stream in front of the rotors 12 and 14. The water diverter 30 is a V- or wedge-shaped body which extends vertically from the stream bed or bottom to a position above the high water line of the stream. A series of screen or catchers may be placed upstream of the water diverter 30 to prevent debris from entering the water engine.

In operation the water diverter 30 divides and concentrates the water as it enters the water driven engine into two distinct water streams and directs the water streams against the rotors blades 22 which are adjacent to the sides of the frame 10 or the sides 26 and 28 of the dam 16. The contact of the two distinct water streams with the rotor blades 22 produces contradirectional rotation of the rotors 12 and 14, i.e., one rotor 12 rotates in a counterclockwise direction and the remaining rotor 14 rotates in a clockwise direction.

Referring now to FIGS. 2, 3, and 4 which illustrate a preferred means for mechanically joining the two contradirectionally rotating rotors 12 and 14, horizontal planar gears or sprockets 32 and 34 are attached to the ends of the rotor shafts 18 and 20, respectively, which extend above the frame 10. The gears 32 and 34 are in parallel but distinct horizontal planes.

A shaft 36 is rotatably mounted above the frame 10 and equidistant between the two rotor shafts 18 and 20 on a ball or roller bearing 24 or the like. A horizontal ring gear or sprocket 38 is attached to the lower end of the shaft 36. The lower gear 34 of the two rotor shaft's horizontal planar gears 34 and 36 is mechanically joined to the shaft's ring gear 38 by a non-slipping mechanical means, e.g., a chain drive 40, a set of gears, or the like.

A hollow shaft 42 is rotatably mounted on the first shaft 36. A horizontal ring gear or sprocket 44 is mounted on the hollow shaft 42. The hollow shaft's ring gear 44 is mechanically joined to the remaining rotor shaft's planar gear 32 by a non-slipping mechanical means, e.g., a chaindrive 46, a set of gears, or the like.

The end of the first shaft 36 extends through the hollow shaft 42 and is attached to a gear means, i.e., a downward projecting ring bevel gear 48. The end of the hollow shaft 42 which is adjacent to the first shaft's ring bevel gear 48 is attached to a gear means, i.e., an upward projecting ring bevel gear 50 with the approximate same exterior diameter as the first shaft's ring bevel gear 48. The first shaft's ring bevel gear 48 and the hollow shaft's ring bevel gear 50 are mechanically joined by a series of one or more bevel gears 52. One of the bevel gear 52 is joined to a shaft 54 which is connected to an energy system. The energy system may be an energy receiving, utilizing, or storing system, e.g., an electrical generator, a motor, or the like.

The mechanism for mechanically joining the contra-directionally rotating rotors 12 and 14 may be enclosed in a casing 56. The shafts 18 and 20 of the rotors may be rotatably mounted in the casing 56 on a ball or roller bearings 24. The end of the first shaft 36 and the shafts 54 and 60 attached to the bevel gears 52, are likewise mounted on or through the casing 56 on ball or roller bearings 24.

The foregoing is considered as illustrative only of the principles of the invention. Further since numerous modifications and changes will readily occur to those skilled in the art, it is not desired to limit the invention to the exact construction and operation shown and described above. It is understood that the scope of the present invention is to be measured only by the limitations of the several claims appended hereto.

I claim:
1. In a water driven engine comprising:
   (a) a frame mounted in a stream of water;
   (b) a first and second vertical rotor rotatably mounted in said frame and having a plurality of overlapping blades;
   (c) a water diverter approximately centrally mounted forward of said first and second vertical rotors so that the flow of water which enters said frame is divided and diverted onto the rotor blades which are adjacent the sides of said frame, thereby rotating one of said rotors clockwise and the remaining rotor counterclockwise; and
   (d) means for mechanically joining said clockwise rotating and said counterclockwise rotating rotor to each other and to an energy system wherein said means for mechanically joining said clockwise rotating rotor and said counterclockwise rotating rotor to each other and to an energy system comprises:
   (e) a first shaft rotatably mounted on said frame, said shaft being mechanically joined to said first vertical rotor;
   (f) a second hollow shaft rotatably mounted on said first shaft, said second hollow shaft being mechanically joined to said second vertical rotor;
   (g) a first gear means attached to the end of said first shaft which end extends through said hollow shaft;
   (h) a second gear means attached to the end of said hollow shaft which end is adjacent the first gear means attached to said first shaft; and
   (i) means for mechanically joining said first and second gear means, the improvement wherein:
   (j) said first shaft is mounted on said frame equidistant from said first and second vertical rotors;
   (k) said first gear means is a downward projecting bevel gear;
   (l) said second gear means is an upward projecting bevel gear; and
   (n) said means for mechanically joining said first and second gear is one or more bevel gears,
   wherein said first shaft is mechanically joined to said first vertical rotor by mechanical means comprising:
   (o) a first planar gear attached to said first shaft;
   (p) a second planar gear attached to the shaft of said first vertical rotor; and
   (q) a chain drive mechanically joining said first and second planar gears; and
   said hollow shaft is mechanically joined to said second vertical rotor by mechanical means comprising:
   (r) a third planar gear attached to said hollow shaft;
   (s) a forth planar gear attached to the shaft of said second vertical rotor; and
   (t) a chain drive mechanically joining said third and forth planar gears.

2. A water driven engine of claim 1 wherein said water diverter is a wedge-shaped water diverter.

3. A water driven engine of claim 1 wherein said frame is mounted in a dam.

* * * * *